T. A. WILLARD.
STORAGE BATTERY.
APPLICATION FILED JULY 6, 1915.

1,194,688.

Patented Aug. 15, 1916.

Inventor
Theodore A. Willard
by Thurston & Kwis
Attys.

UNITED STATES PATENT OFFICE.

THEODORE A. WILLARD, OF CLEVELAND, OHIO, ASSIGNOR TO THE WILLARD STORAGE BATTERY COMPANY, OF CLEVELAND, OHIO, A CORPORATION OF OHIO.

STORAGE BATTERY.

1,194,688.     Specification of Letters Patent.     Patented Aug. 15, 1916.

Application filed July 6, 1915. Serial No. 38,167.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries, and particularly to means for sealing terminal posts for the prevention of creepage of battery solution around the posts to the exterior of the battery cover.

The main object of the invention is to provide a construction such that there is secured an automatic sealing as the parts are assembled, and particularly when the cover of the battery jar is placed in position on or inside the top portion of the jar.

A further object is to facilitate and reduce the expense of assembling, and particularly of sealing the posts, and to do away with the necessity of closely and accurately fitting parts.

My invention may be briefly summarized as consisting in certain novel details of construction and combination and arrangement of parts which shall be described in the specification and set forth in the appended claims.

Figure 1:
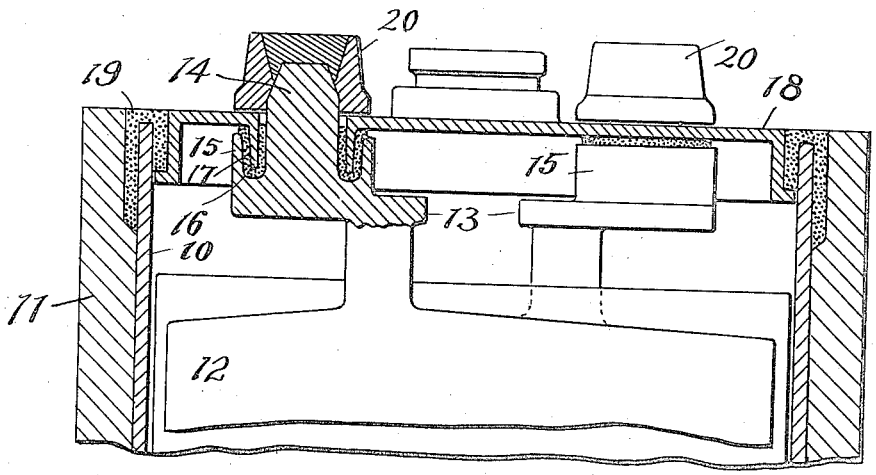
Figure 2:
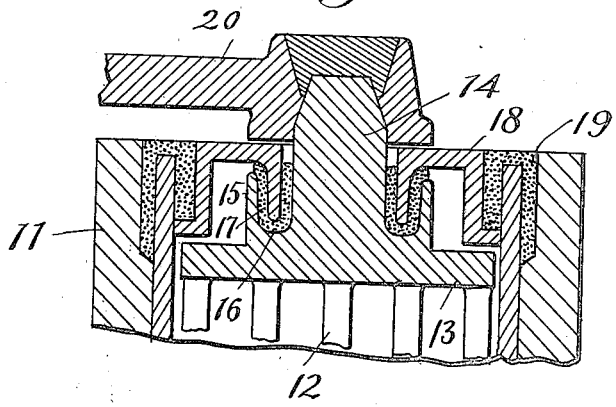

In the accompanying sheet of drawings, Figure 1 is a vertical sectional view through the top portion of a storage battery embodying my invention, and Fig. 2 is a sectional view at right angles to the section of Fig. 1.

Referring now to the drawings, 10 represents the battery jar, a number of which are usually placed side by side in a battery box 11, and are sealed therein. The jar contains positive and negative battery plates 12, the plates of the two polarites being connected together in the usual manner by lead traps 13 from which extend upwardly positive and negative lead terminal posts 14.

Extending about each posts and preferably near the base thereof is an upstanding flange 15 which is spaced from the posts and forms a groove or recess 16 of considerable depth entirely surrounding the posts. This flange 15 and the groove 16 which is formed by it are utilized to automatically seal the post when the cover is placed in position, and to that end before the cover is placed in position this groove 16 surrounding the post is filled with a suitable sealing compound 17 which when applied to the groove or recess is in liquid or substantially liquid form.

The battery is provided with a cover 18 which is sealed around its edge or perimeter with cement or sealing compound 19. This cover is provided with openings through which the terminal posts loosely extend, and on its lower side is provided with depending flanges or petticoats which extend about said openings and which are of such depth that when the cover is placed in position in or on the jar said flanges will extend down loosely between the posts 14 and flanges 15 into the grooves or depressions surrounding the posts nearly to the base or bottom thereof. After the cover is placed in position, connectors 20 will be fitted to the upper ends of the posts and will be lead burned thereto. Thus as the cover is placed into the jar with the upper ends of the posts extending up through the cover, the posts are automatically sealed against leakage of battery solution to the exterior of the cover. If desired, the covers may be heated before being put in place so that when the depending flanges enter the sealing compound the latter will be melted or fused. This may be employed if the sealing compound is not in melted or soft condition when the cover is placed in position. An additional advantage of this construction lies in the fact that the parts can be assembled quickly, and the accurate fitting and positioning of the parts heretofore required is eliminated, while at the same time the appearance, durability and efficiency of the battery is not in any way impaired.

The terminal posts, the openings in the cover through which the posts extend, and the overlapping flanges on the posts and cover respectively, may be round or annular in shape, or they may be of any other shape, such as square or rectangular, it being understood of course, that the shape of the openings in the cover and the cross sectional shape of the flanges will correspond to the cross sectional shape of the posts.

Having described my invention, I claim:

1. In a storage battery, a battery jar having a cover, and a terminal post extending through the cover and provided adjacent its base with an enlargement which contains an upwardly facing well surrounding the post, the cover being provided with a portion extending into and sealed in the wall.

2. In a storage battery, a battery jar having a cover, and a terminal post having a portion of normal diameter which extends through the cover and is surrounded by an upturned flange forming a well, and the cover having a downturned portion extending into the well.

3. In a storage battery, a battery jar, a cover for the jar, a terminal post extending upwardly through the cover, said post having a recess or depression extending about the same and containing sealing compound, and the cover having a portion extending into the sealing compound in the recess.

4. In a storage battery, a jar having a cover provided with an opening for a terminal post, a terminal post extending through said opening, said post and cover having a pair of interfitting and overlapping flanges extending substantially in the direction of the axis of the post.

5. In a storage battery, a jar, a cover therefor provided with an opening, a terminal post extending through the opening, said post having an upstanding flange forming a recess or groove extending about the post, said recess or grooves containing a sealing compound, and said cover having a depending flange or petticoat extending about said opening and projecting downwardly into the sealing compound in said recess or groove.

In testimony whereof, I hereunto affix my signature.

THEODORE A. WILLARD.